(12) United States Patent
Chiu

(10) Patent No.: US 7,922,432 B2
(45) Date of Patent: Apr. 12, 2011

(54) QUICK-POSITIONING SCREW ASSEMBLY

(75) Inventor: Ming-Chung Chiu, Keelung (TW)

(73) Assignee: Hanwit Precision Industries Ltd., Sijhih, Taipei County (TW)

( * ) Notice: Subject to any disclaimer, the term of this patent is extended or adjusted under 35 U.S.C. 154(b) by 233 days.

(21) Appl. No.: 12/326,890

(22) Filed: Dec. 3, 2008

(65) Prior Publication Data

US 2010/0132178 A1 Jun. 3, 2010

(51) Int. Cl.
*F16B 39/00* (2006.01)
(52) U.S. Cl. .......................... 411/107; 411/353
(58) Field of Classification Search ............... 411/107, 411/347, 353, 360, 999
See application file for complete search history.

(56) References Cited

U.S. PATENT DOCUMENTS

| | | | | |
|---|---|---|---|---|
| 3,343,581 A | * | 9/1967 | Martin et al. | 411/349 |
| 5,382,124 A | * | 1/1995 | Frattarola | 411/352 |
| 5,462,395 A | * | 10/1995 | Damm et al. | 411/107 |
| 5,871,319 A | * | 2/1999 | Schneider | 411/107 |
| 6,079,923 A | * | 6/2000 | Ross et al. | 411/353 |
| 2005/0019133 A1 | * | 1/2005 | Allen et al. | 411/353 |

* cited by examiner

*Primary Examiner* — Gary Estremsky
(74) *Attorney, Agent, or Firm* — Muncy, Geissler, Olds & Lowe, PLLC

(57) ABSTRACT

A quick-positioning screw assembly includes a cap having an inside annular flange and a locating groove or locating rib extending around the inside wall, a mounting socket bonded to a mounting through hole of a first plate member and having a top positioning flange extending around the periphery and detachably forced into engagement with the locating groove or locating rib of the cap, a screw press-fitted into the inner diameter of the inside annular flange of the cap for threading into a screw hole on a second plate member to secure the first plate member to the second plate member, and a compression spring mounted in the cap around the screw and stopped between the inside annular flange of the cap and an inside annular flange of the mounting socket.

6 Claims, 8 Drawing Sheets

QUICK-POSITIONING SCREW ASSEMBLY

BACKGROUND OF THE INVENTION

1. Field of the Invention

The present invention relates to a screw assembly and more particularly, to a quick positioning screw assembly that can quickly and accurately be installed in a first plate member by a mounting system for securing the first plate member to a second plate member.

2. Description of the Related Art

Fastening plate members in a stack is an application of stacking attachment technique to fully utilize the space. With respect to the functioning of the power drive or speed-adjustment unit of a machine tool, when a machine base failed or an adjustment of the speed of the machine is necessary, a movable plate member will be detachably mounted on a housing of the power drive or speed-adjustment unit. Screw bolts are commonly used to secure the movable plate member to the machine tool. When unfastening screw bolts to dismount the movable plate member from the machine tool, the associating lock nuts may fall from the screw bolts.

FIG. 8 shows a positioning screw assembly for securing two plate members together. As illustrated, the positioning screw assembly is comprised of a cap A, a screw B, a spring member C, a mounting socket D and a Teflon ring F. This positioning screw assembly is to be picked up for installation manually. During installation, hold the cap A with the hand to move the positioning screw assembly into alignment with a mounting through hole E1 on a first plate member E, and then insert the front (bottom) end of the mounting socket D into the mounting through hole E1 to have a mounting flange D1 of the mounting socket D be bonded to the top wall of the first plat member E with a solder paste E2. Picking up the positioning screw assembly for installation manually wastes much time and labor. For automatic installation by a mounting system, the Teflon ring F may be used with the positioning screw assembly. The Teflon ring F is inserted into the bottom hole of the mounting socket D and forced into friction engagement with the periphery of the bottom end of the screw B to lock the cap A, the screw B and the mounting socket D, allowing the positioning screw assembly to be picked up by a mounting system for quick installation. Immediately after bonding of the mounting socket D to the first plate member E, the cap A and the screw B must be rotated to force the Teflon ring F away from the mounting socket D and the first plate member E so that the cap A can be lowered relative to the mounting socket D and the first plate member E for enabling the screw B to be driven into a second plate member E. When many toxic Teflon rings F fall to the ground in the working environment, they will contaminate the surroundings, and the workers' skin may touch the toxic Teflon rings F accidentally. Further, it requires much labor to pick up and pack the fallen Teflon rings F. Further, a special storage place is necessary to keep the packed Teflon rings F in place.

SUMMARY OF THE INVENTION

The present invention has been accomplished under the circumstances in view. It is therefore the main object of the present invention to provide a quick-positioning screw assembly, which allows quick and accurate installation to secure a first plate member to a second plate member by means of a mounting system, avoiding falling of any component parts.

To achieve this and other objects of the present invention, the quick-positioning screw assembly comprises a cap having an inside annular flange, a mounting socket fastened to a mounting through hole of a first plate member, a screw press-fitted into engagement with the inside annular flange of the cap for threading into a screw hole on a second plate member to secure the first plate member to the second plate member, and an elastic member mounted in the cap around the screw and stopped between the cap and the mounting socket. The cap has a locating means disposed adjacent to the inside annular flange. The mounting socket has a top positioning flange extending around the periphery at the top side and forced into engagement with the locating means of the cap to have the cap be locked to the mounting socket. When applying a pull force to the cap relative to the mounting socket, the cap is unlocked from the mounting socket.

Further, the mounting socket has a lower positioning flange extending around the periphery and spaced below the top positioning flange for bonding to the top wall of a first plate member around a mounting through hole with a solder paste so that the screw can be lowered with the cap to pass through the mounting through hole and to be further rotated and threaded into a screw hole on a second plate member to secure the first plate member to the second plate member.

DETAILED DESCRIPTION OF THE PREFERRED EMBODIMENT

Figure 1:
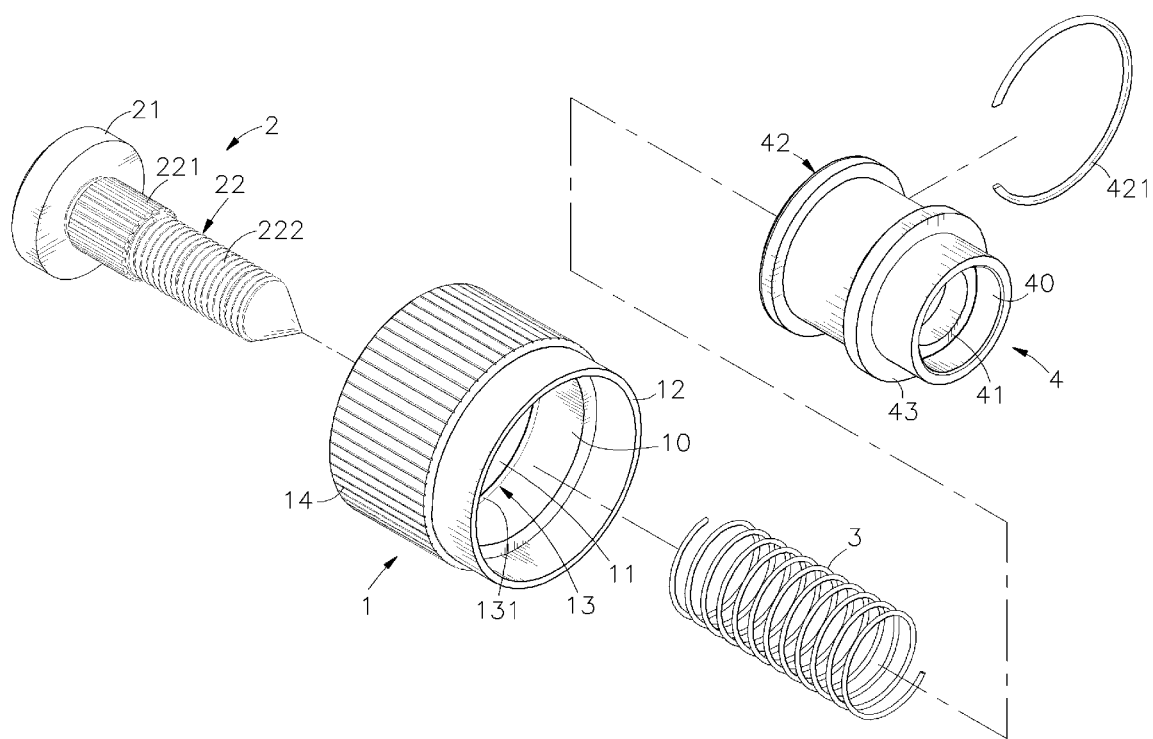
FIG. 1 is an exploded view of a quick-positioning screw assembly in accordance with a first embodiment of the present invention.

Referring to FIG. 1, a quick-positioning screw assembly in accordance with a first embodiment of the present invention is shown comprised of a cap 1, a screw 2, an elastic member 3 and a mounting socket 4.

The cap 1 has a through hole 10 extending through top and bottom sides thereof, an inside annular flange 11 suspending in the through hole 10, a relatively thinner front extension cap wall 12 axially forwardly extending the bottom side of the peripheral wall, and a locating means 13, for example, a locating groove 131 extending around the border area between the inside annular flange 11 and the peripheral wall of the cap 1.

The screw 2 has a head 21 supported on the inside annular flange 11 in the cap 1, and a screw body 22 inserted through the through hole 10 of the cap 1. The screw body 22 includes a toothed shoulder 221 formed integral with the bottom wall of the head 21 and press-fitted into the tight engagement with the inside annular flange 11 of the cap 1, and a threaded shank 222 axially extending from the bottom side of the toothed shoulder 221 and suspending out of the through hole 10 of the cap 1.

The elastic member 3 according to this embodiment is a compression spring sleeved onto the screw body 22 of the screw 2 and stopped at the bottom side of the inside annular flange 11 of the cap 1.

The mounting socket 4 is a stepped tubular member having a through hole 40 axially extending through the top and bottom sides thereof for accommodating the screw body 22 of the screw 2 and the elastic member 3, an inside annular flange 41 extending around the inside wall near the bottom side for supporting the elastic member 3, a top positioning flange 42 extending around the periphery in flush with the top side, and a lower positioning flange 43 extending around the periphery near the bottom side but kept spaced above the bottom side at a predetermined distance.

Figure 2:
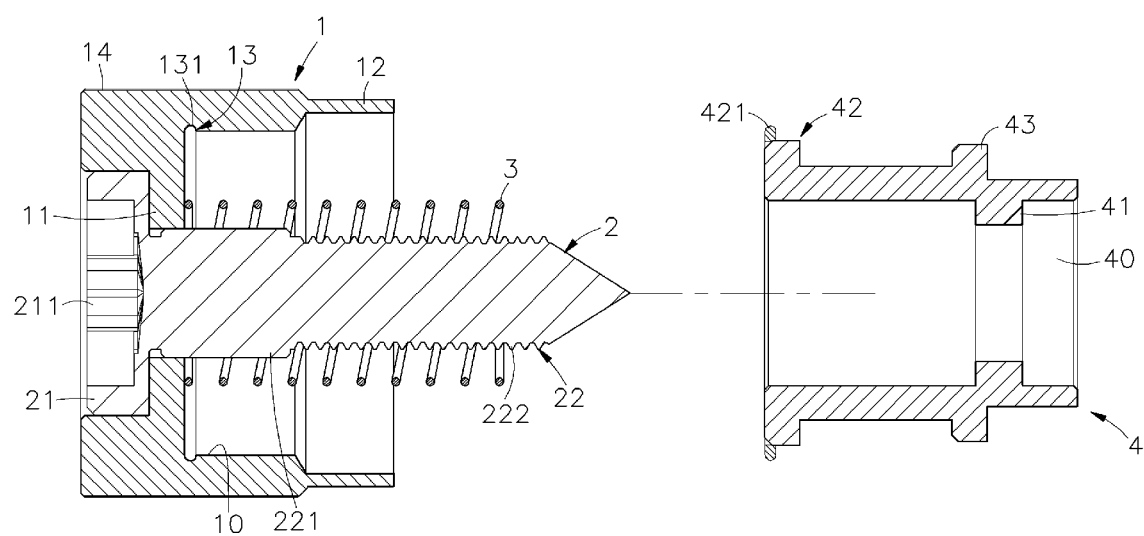
FIG. 2 is a sectional view of the quick-positioning screw assembly in accordance with the first embodiment of the present invention, showing the screw and the elastic member secured to the cap before connection between the mounting socket and the cap.

Referring to FIG. 2, when assembling the quick-positioning screw assembly, insert the screw body 22 of the screw 2 through the through hole 10 of the cap 1 to force the toothed shoulder 221 into positive engagement with the inside wall of the inside annular flange 11 of the cap 1 so that the screw 2 and the cap 1 are firmly secured together. Thereafter, sleeve the elastic member 3 onto the screw body 22 of the screw 2, and then insert the top positioning flange 42 of the mounting socket 4 into the through hole 10 of the cap 1 from the bottom side to have the elastic member 3 be received in the through hole 40 of the mounting socket 4 and stopped between the inside annular flange 41 of the mounting socket 4 and the bottom wall of the inside annular flange 11 of the cap 1. At the same time, a retaining device 421 (for example, C-shaped retaining ring or packing ring) is positioned in the locating groove 131 inside the cap 1.

Figure 3:
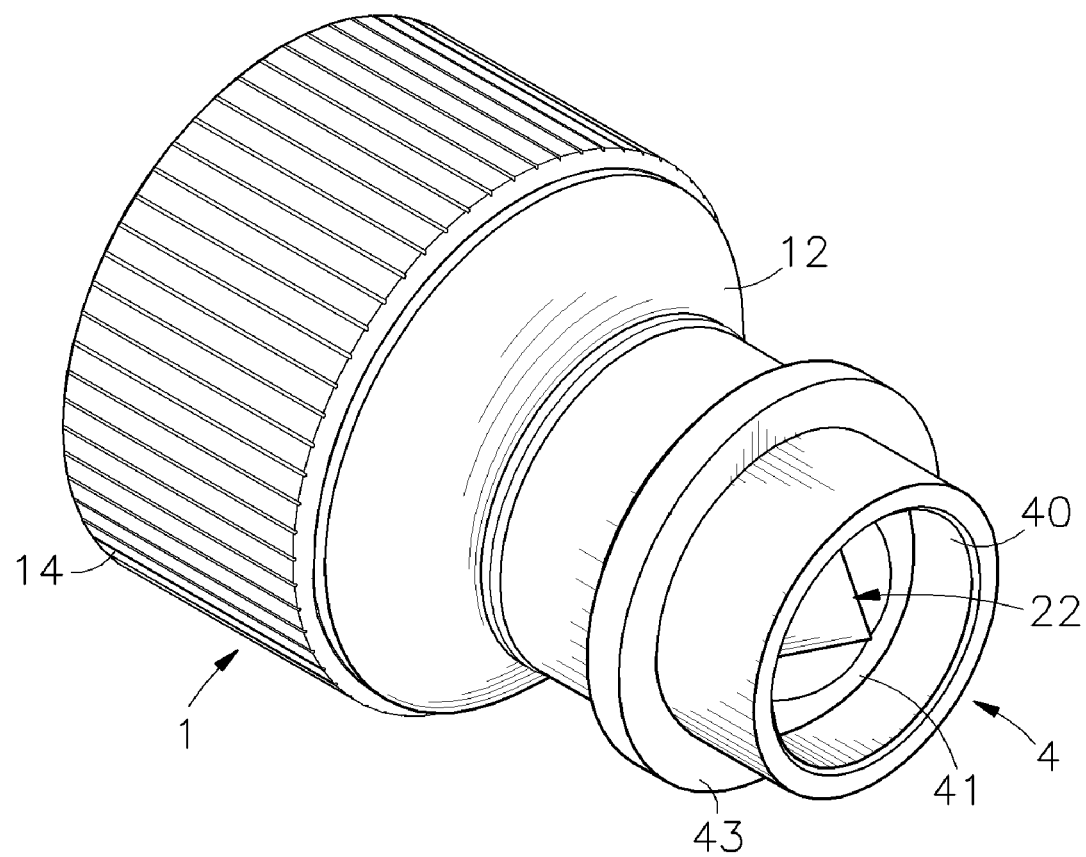
FIG. 3 is an elevational assembly view of the quick-positioning screw assembly in accordance with the first embodiment of the present invention.

Referring to FIG. 3 and FIG. 2 again, after attaching the mounting socket 4 to the inside of the cap 1 to hold the elastic member 3, the relatively thinner front extension cap wall 12 of the cap 1 is bent inwards with tool means and abutted against the peripheral wall of the mounting socket 4 between the top positioning flange 42 and the lower positioning flange 43, avoiding escape of the mounting socket 4 from the cap 1.

Figure 4:
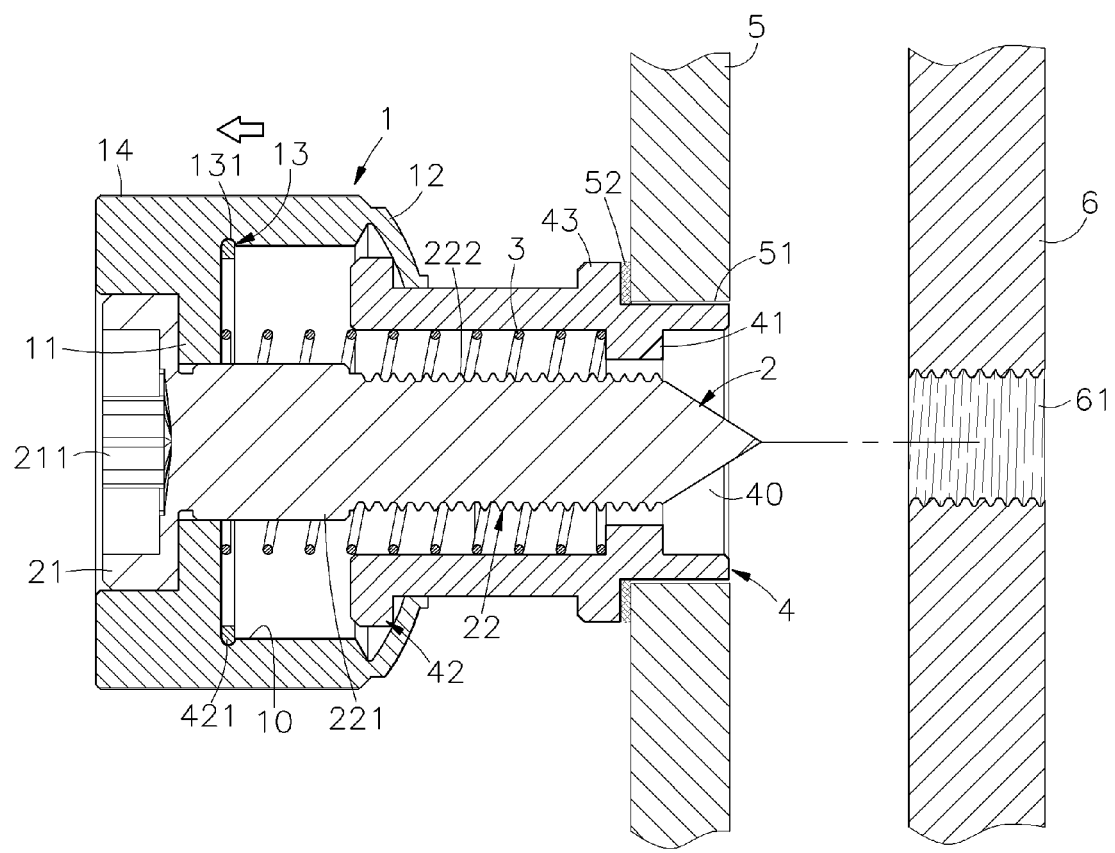
FIG. 4 is a sectional view showing an application example of the quick-positioning screw assembly in accordance with the first embodiment of the present invention.
Figure 5:
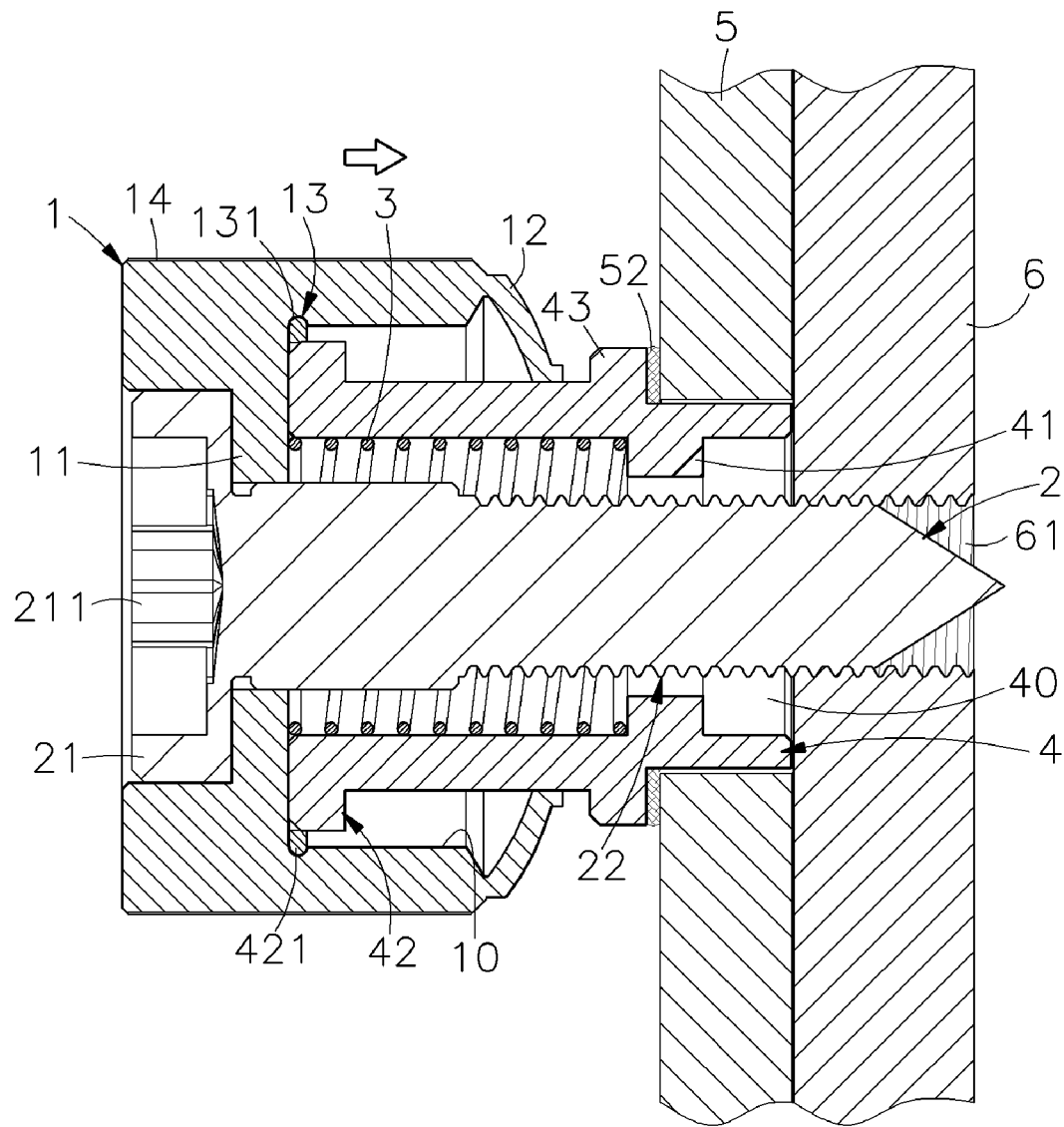
FIG. 5 corresponding to FIG. 4, showing the screw threaded into the screw hole of the second plate member.

Referring to FIGS. 4 and 5, during the use of the quick-positioning screw assembly, catch the cap 1 of the quick-positioning screw assembly with a mechanical arm, and then move the quick-positioning screw assembly into vertical alignment with a mounting through hole 51 on a first plate member 5, and then insert the mounting socket 4 into the mounting through hole 51 of the first plate member 5 to have the lower positioning flange 43 be stopped at a solder paste 52 on the top wall of the first plate member 5 around the mounting through hole 51 and soldered to the first plate member 5 by the solder paste 52 by means of a soldering process. Thereafter, pull the cap 1 outwards with the hand to disengage the locating means 13 from the top positioning flange 42 of the mounting socket 4, allowing the relatively thinner front extension cap wall 12 to be with the cap 1 relative to the mounting socket 4 between the top positioning flange 42 and lower positioning flange 43 of the mounting socket 4. At this time, the first plate member 5 can then be attached to a second plate member 6, for enabling the screw 2 to be forced downwards and then rotated to thread the threaded shank 222 into a corresponding screw hole 61 on the second plate member 6. After the threaded shank 222 has been threaded into the screw hole 61 of the second plate member 6, the first plate member 5 is firmly secured to the second plate member 6.

When wishing to remove the first plate member 5 from the second plate member 6, rotate the cap 1 with the screw 2 in the reversed direction to disconnect the threaded shank 222 from the screw hole 61 of the second plate member 6. After disengagement between the screw 2 and the screw hole 61, the first plate member 5 is disconnected from the second plate member 6. Further, grooves 14 can be formed on the periphery of the cap 1, facilitating rotation of the cap 1 by hand. Further, a tool groove 211 can be formed on the top wall of the head 21 of the screw 2 for the positioning of a hand toll (such as screwdriver) to be used to rotate the screw 2.

Figure 6:
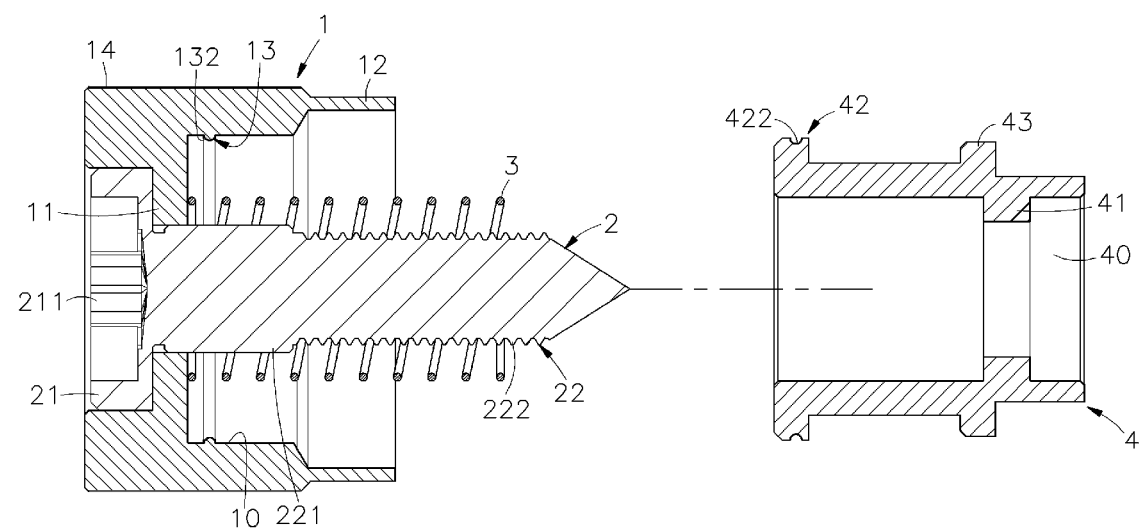
FIG. 6 is a sectional view of a quick-positioning screw assembly in accordance with a second embodiment of the present invention.

FIG. 6 shows a quick-positioning screw assembly in accordance with a second embodiment of the present invention. This second embodiment is substantially similar to the aforesaid first embodiment with the exception that the locating means 13 of the cap 1 according to this second embodiment is a locating rib 132 extending around the inside wall of the cap 1; the top positioning flange 42 of the mounting socket 4 has a locating groove 422 extending around the periphery for engagement with the locating rib 132.

Figure 7:
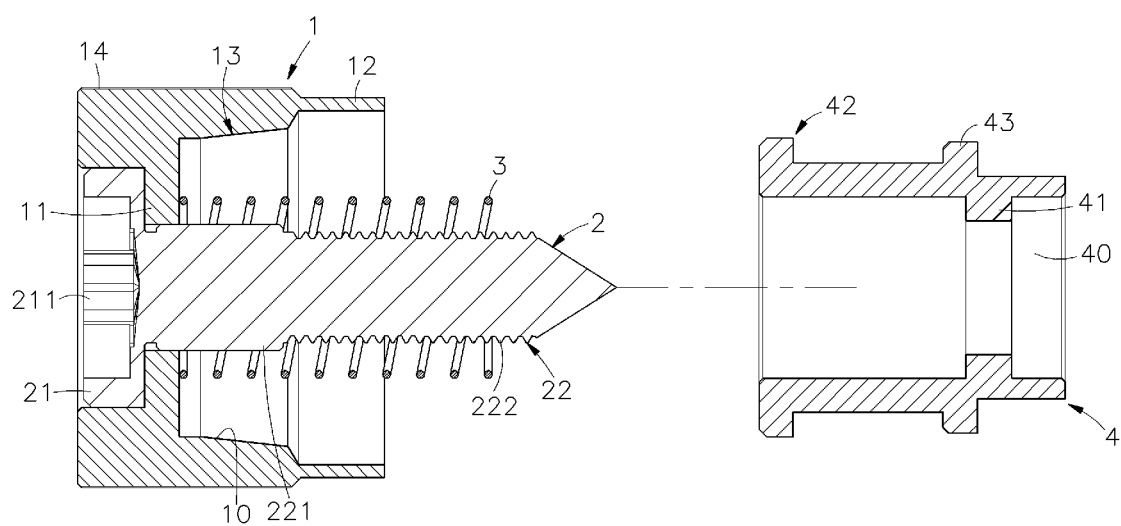
FIG. 7 is a sectional view of a quick-positioning screw assembly in accordance with a third embodiment of the present invention.
Figure 8:
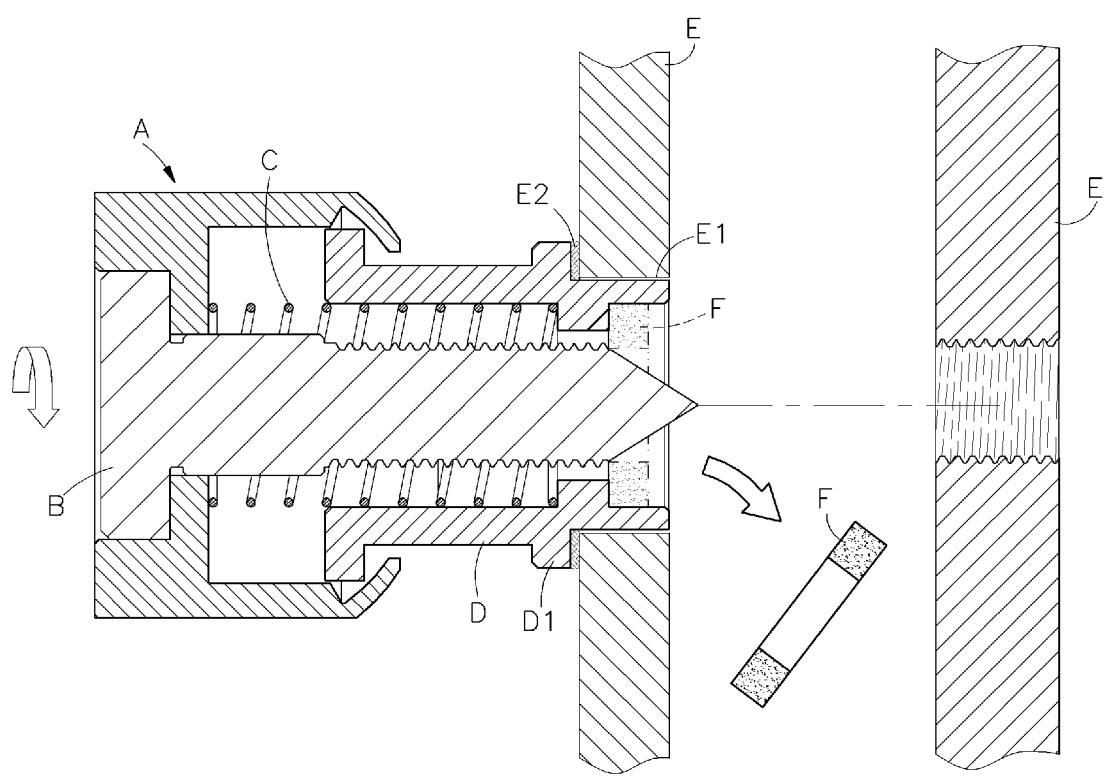
FIG. 8 is a schematic sectional view of a conventional positioning screw assembly.

FIG. 7 shows a quick-positioning screw assembly in accordance with a third embodiment of the present invention. This third embodiment is substantially similar to the aforesaid first embodiment with the exception that the locating means 13 of the cap 1 according to this second embodiment is a tapered inside wall that defines an inner diameter gradually increasing from the top side toward the bottom side; the top positioning flange 42 of the mounting socket 4 is chamfered and can be into the cap 1 from the bottom side and forced into friction engagement with the upper part of the tapered inside wall of the cap 1.

In general, the invention provides a quick-positioning screw assembly, which comprises a cap 1, a screw 2 inserted through the cap 1 and secured to an inside annular flange 11 of the cap 1, a mounting socket 4 coupled to the cap 1 around the screw 2, and an elastic member 3 sleeved onto the screw 2 and stopped between the inside annular flange 11 and an inside annular flange 41 of the mounting socket 4. The cap 1 has a locating means 13 located on the inside. The mounting socket 4 has a top positioning flange 42 secured to the locating means 13. When applying a pull force to the cap 1 relative to the mounting socket 4, the top positioning flange 42 of the mounting socket 4 is unlocked from the locating means 13 of the cap 1 for allowing axial movement of the cap 1 relative to the mounting socket 4. At this time, the cap 1 and the mounting socket 4 are coupled together and can be moved axially relative to each other.

In conclusion, the quick-positioning screw assembly of the present invention has the following features and advantages:

1. When the quick-positioning screw assembly is assembled, the top positioning flange 42 of the mounting socket 4 is kept secured to the locating means 13 of the cap 1. By means of applying a pull force to the cap 1 relative to the mounting socket 4, the top positioning flange 42 of the mounting socket 4 is unlocked from the locating means 13 of the cap 1 for allowing axial movement of the cap 1 relative to the mounting socket 4.

2. The design of the lower positioning flange 43 of the mounting socket 4 enables the mounting socket 4 to be quickly and accurately bonded to mounting through hole 51 of the first plate member 5 by the solder paste 42 by means of a mounting system.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A quick-positioning screw assembly comprised of a cap, a mounting socket fastened to a mounting through hole of a first plate member, a screw mounted in said cap for threading into a screw hole on a second plate member to secure said first plate member to said second plate member, elastic member mounted in said cap around said screw and stopped between said cap and said mounting socket, and a retaining device adapted to secure said top positioning flange of said mounting socket to said locating means of said cap, wherein:

said cap comprises an inside annular flange extending around an inside wall thereof and a locating means disposed adjacent to said inside annular flange;

said screw is press-fitted into said cap, comprising a threaded shank extending to the outside of said cap;

said elastic member is sleeved onto said threaded shank of said screw, having a first end stopped at a bottom side of said inside annular flange of said cap and a second end opposite to said first end;

said mounting socket is inserted into said cap to surround said threaded shank of said screw and said elastic member, the mounting socket comprising an inside annular flange that is stopped against said second end of said elastic member, a top positioning flange extending around the periphery thereof at a top side and engageable to said locating means of said cap, and a lower positioning flange extending the periphery thereof for positioning on a top wall of said first plate member around said mounting through hole of said first plate member; and wherein said retaining device is a C-shaped retaining ring.

2. The quick-positioning screw assembly as claimed in claim 1, wherein said locating means is a tapered inside wall formed on the inside of said cap; said top positioning flange is forced into friction engagement with said tapered inside wall of said cap.

3. The quick-positioning screw assembly as claimed in claim 1, wherein said screw comprises a head supported on the inside annular flange of said cap, and a toothed shoulder connected between said head and said threaded shank of said screw and forced into friction engagement with an inner diameter of said inside annular flange of said cap.

4. The quick-positioning screw assembly as claimed in claim 1, wherein said locating means is a locating groove extending around the inside wall of said cap.

5. The quick-positioning screw assembly as claimed in claim 1, wherein said locating means is a locating rib extending around the inside wall of said cap; said top positioning flange of said mounting socket comprises a locating groove extending around the periphery thereof for engagement with said locating rib of said locating means of said cap.

6. The quick-positioning screw assembly as claimed in claim 1, wherein said lower positioning flange of said mounting socket is bonded to the top wall of said first plate member around said mounting through hole of said first plate member with a solder paste.

* * * * *